US009674870B1

(12) United States Patent
Chaganti et al.

(10) Patent No.: US 9,674,870 B1
(45) Date of Patent: Jun. 6, 2017

(54) MOBILE GATEWAY HAVING REDUCED FORWARDING STATE FOR ANCHORING MOBILE SUBSCRIBERS

(71) Applicant: Juniper Networks, Inc., Sunnyvale, CA (US)

(72) Inventors: Srinivasa Chaganti, Santa Clara, CA (US); Apurva Mehta, Cupertino, CA (US); Gopi Krishna, Tracy, CA (US); Bin W. Hong, San Jose, CA (US); Santosh Gupta, Fremont, CA (US); Bobby Vandalore, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 710 days.

(21) Appl. No.: 14/159,244

(22) Filed: Jan. 20, 2014

Related U.S. Application Data

(62) Division of application No. 13/248,834, filed on Sep. 29, 2011, now Pat. No. 8,635,326.

(51) Int. Cl.
*G06F 15/173* (2006.01)
*H04W 74/00* (2009.01)

(52) U.S. Cl.
CPC ................. *H04W 74/002* (2013.01)

(58) Field of Classification Search
None
See application file for complete search history.

(56) References Cited

U.S. PATENT DOCUMENTS

| 8,050,559 | B2 | 11/2011 | Sindhu |
| 8,339,959 | B1 | 12/2012 | Moisand et al. |
| 8,514,756 | B1 | 8/2013 | Ramachandra et al. |
| 8,635,326 | B1 | 1/2014 | Chaganti et al. |

(Continued)

OTHER PUBLICATIONS

3GPP TS 23.401, V10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 261 pp.

(Continued)

*Primary Examiner* — Natisha Cox
(74) *Attorney, Agent, or Firm* — Shumaker & Sieffert, P.A.

(57) ABSTRACT

In general, techniques are described for aggregating, within a network device, internal forwarding routes for multiple control protocols and allocating next hops for the routes among individual service units of a decentralized control plane for the network device. The techniques may also include aggregating internal forwarding routes for data protocols and allocating next hops for the routes among individual forwarding units of a decentralized data plane for the network device. In one example, a mobile gateway includes a plurality of subscriber management service units that present a uniform interface to nodes within a mobile service provider network. An allocation manager apportions a control protocol session identifier namespace into a plurality of contiguous, non-overlapping protocol session identifier ranges and allocates the ranges among the service units. The service units execute the control protocol by utilizing respective allocated ranges, which the aggregate internal forwarding routes use to identify the associated service units.

19 Claims, 5 Drawing Sheets

(56) References Cited

U.S. PATENT DOCUMENTS

| | | | |
|---|---|---|---|
| 2009/0290540 A1* | 11/2009 | Cherian | H04L 47/10 370/328 |
| 2010/0157897 A1 | 6/2010 | Yoon et al. | |
| 2010/0281148 A1* | 11/2010 | Turanyi | H04W 8/06 709/222 |
| 2011/0090868 A1* | 4/2011 | Zhang | H04W 8/12 370/331 |
| 2011/0131338 A1* | 6/2011 | Hu | H04W 76/02 709/229 |
| 2011/0320608 A1* | 12/2011 | Nelakonda | H04L 12/00 709/226 |
| 2012/0155442 A1* | 6/2012 | Haddad | H04W 8/065 370/338 |
| 2012/0184294 A1* | 7/2012 | Stojanovski | H04W 48/17 455/456.1 |
| 2013/0003727 A1* | 1/2013 | Ramaraj | H04L 63/0236 370/389 |
| 2013/0003736 A1 | 1/2013 | Szyszko et al. | |

OTHER PUBLICATIONS

3GPP TS 36.300, V10.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Jun. 2010, 183 pp.

Prosecution History from U.S. Pat. No. 8,635,326, dated May 23, 2013 through Sep. 9, 2013, 41 pp.

* cited by examiner

MOBILE GATEWAY HAVING REDUCED FORWARDING STATE FOR ANCHORING MOBILE SUBSCRIBERS

This application is a divisional of U.S. application Ser. No. 13/248,834, filed Sep. 29, 2011, the entire contents of which are incorporated herein by reference.

TECHNICAL FIELD

The invention relates to mobile networks and, more specifically, to session handling within mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an enhancement of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GPP/2) and the Worldwide Interoperability for Microwave Access (WiMAX) forum.

A typical 3GPP mobile service provider network, or mobile network, includes a core packet-switched network, a transport network, and one or more radio access networks. The core packet-switched network for the mobile network uses a variety of control protocols to authenticate users and establish logical connections, known as bearers, among the many service nodes on a path between a wireless device, attached to one of the radio access networks, and a packet data network (PDN). The service nodes then utilize the bearers, which employ data protocols, to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs. The numerous and varied control and data protocols employed by mobile service provider networks to facilitate mobile communications, together with an increasing number of services available to an increasing number of mobile subscriber devices, introduce substantial state data complexities into mobile network devices.

SUMMARY

In general, techniques are described for aggregating, within a network device, internal forwarding routes for multiple control protocols and allocating next hops for the routes among individual service units of a decentralized control plane for the network device. The techniques may also include aggregating internal forwarding routes for data protocols and allocating next hops for the routes among individual forwarding units of a decentralized data plane for the network device. For example, a mobile gateway device is described having an internal architecture that offloads subscriber session control protocol management from a centralized control node to a set of service units (e.g., subscriber management service cards). In this sense, the subscriber management service units provide a form of a decentralized control plane for managing subscriber control protocol sessions. The mobile gateway device may also include a decentralized data or forwarding plane that includes a set of forwarding units (e.g., packet forwarding engines (PFEs)), coupled by a high-speed switching fabric, for implementing subscriber sessions.

The set of individual service units of the mobile gateway device provide multiple possible anchor points for the multiple control protocols for each individual subscriber session managed by the mobile gateway device for a mobile network by which the corresponding subscriber device accesses packet-based data services. Each individual subscriber session is associated with a session context stored by an anchoring service unit for the subscriber that includes control protocol state for each of the multiple control protocols in operation for the subscriber, such as GPRS tunneling protocol (control) (GTP-C), Dynamic Host Configuration Protocol (DHCP), and Remote Authentication Dial-In User Service (RADIUS). The set of individual forwarding units of the mobile gateway device provide multiple possible anchor points for respective data tunnels for each individual subscriber session, and the anchoring forwarding unit for a particular subscriber session stores a session context that includes forwarding state for the subscriber session data tunnel established in accordance with a data protocol, such as GTP-U(ser data).

In one example, a centralized protocol range allocation manager apportions the respective namespaces of protocol session identifiers for the various protocols that uniquely identify control protocol or data protocol session contexts. The protocol range allocation manager dynamically allocates contiguous, non-overlapping ranges of the namespace for use by respective service units in establishing and distinguishing protocol sessions. That is, a service unit, having received a protocol session identifier range from the protocol range allocation manager, uses the constituent protocol session identifiers of the range when establishing and anchoring protocol sessions for the protocol. For data protocol sessions having session contexts stored by forwarding units for use in high-speed forwarding of session data traffic, the service units may additionally bind the allocated protocol session identifier range to a chosen one of the forwarding units to indicate that protocol session identifiers within the range are anchored by the chosen forwarding unit. A service unit that binds a protocol session identifier range to a chosen forwarding unit then uses the chosen forwarding unit to anchor those data sessions that the service unit establishes using constituent protocol session identifiers of the range.

The protocol range allocation manager directs installation, to the forwarding units, of aggregate routes that specify internal forwarding paths for contiguous, non-overlapping ranges of allocated protocol session identifiers for the various protocols. For instance, an aggregate route for a control protocol may specify a particular one of the service units of the mobile gateway device as a next hop for a contiguous, non-overlapping range of protocol session identifiers for the control protocol. Similarly, an aggregate route for a data protocol may specify a particular one of the forwarding units of the mobile gateway device as a next hop for a contiguous, non-overlapping range of protocol session identifiers for the data protocol that is bound to the forwarding unit. Ingress forwarding units for subscriber control and data traffic forward the traffic to the internal forwarding next hop (e.g., a service unit or a forwarding unit) specified by the aggregate routes installed by the protocol range allocation manager.

The techniques may therefore reduce forwarding state within the ingress forwarding units by combining a number of protocol session identifiers into a contiguous range and using the range, rather than individual constituent protocol session identifiers, as a lookup key that maps to an internal next hop within a forwarding table. This may increase scalability of the mobile gateway device to handle thousands or millions of concurrent protocol sessions for subscribers. In addition, allocating non-overlapping protocol session identifier ranges to service units facilitates decentralized protocol session handling by the service units by permitting the anchoring service unit for a protocol session to be identified on the basis of a protocol session identifier, rather than on the basis of a separate network address for each service unit. As such, the techniques may also enable the service units to share a common network address, simplifying both mobile gateway device and mobile service provider network configuration.

In one embodiment, a method of managing subscriber sessions with a mobile gateway of a mobile service provider network that provides access to services of one or more packet data networks includes apportioning a protocol session identifier namespace for a control protocol into a plurality of contiguous, non-overlapping protocol session identifier ranges with the mobile gateway. The method also includes allocating a first one of the protocol session identifier ranges to one of a plurality of subscriber management service units of the mobile gateway that present a uniform interface to nodes within the mobile service provider network. The method further includes receiving a session request with the subscriber management service unit, wherein the session request identifies a mobile device and requests the mobile gateway to serve as an anchor for a subscriber session for the mobile device when accessing one of the packet data networks. The method also includes selecting a protocol session identifier of the first protocol session identifier range with the subscriber management service unit. The method also includes executing, with the subscriber management service unit in response to the session request, the control protocol to exchange control protocol messages with an external server in a protocol session identifiable by the selected protocol session identifier.

In another embodiment, a method of managing subscriber sessions with a mobile gateway of a mobile service provider network that provides access to services of one or more packet data networks includes apportioning a protocol session identifier namespace for a data protocol into a plurality of contiguous, non-overlapping protocol session identifier ranges. The method also includes receiving a session request with one of the subscriber management service units, wherein the session request identifies a mobile device and requests the mobile gateway to serve as an anchor for a subscriber session for the mobile device when accessing one of the packet data networks. The method further includes binding a first one of the protocol session identifier ranges to a first one of a plurality of forwarding units of the mobile gateway with the subscriber management service unit. The method further includes establishing the subscriber session with the subscriber management service unit. The method also includes associating, with the subscriber management service unit, a protocol session identifier of the first protocol session identifier range with the subscriber session. The method further includes, based at least on the binding, anchoring the subscriber session with the first forwarding unit.

In another embodiment, a mobile gateway of a mobile service provider network that provides access to services of one or more packet data networks includes a plurality of subscriber management service units that present a uniform interface to nodes within the mobile service provider network. The mobile gateway further includes a routing unit that executes routing protocols to exchange routing information with network devices. The mobile gateway also includes an allocation manager of the routing unit that apportions a protocol session identifier namespace for a control protocol into a plurality of contiguous, non-overlapping protocol session identifier ranges, wherein the allocation manager allocates a first one of the protocol session identifier ranges to one of the subscriber management service units. The mobile gateway further includes a protocol ranges data structure that stores the first protocol session identifier range. The mobile gateway also includes a session control module of the subscriber management service unit that receives a session request, wherein the session request identifies a mobile device and requests the mobile gateway to serve as an anchor for a subscriber session for the mobile device when accessing one of the packet data networks, wherein the session control module selects a protocol session identifier of the first protocol session identifier range from the protocol ranges data structure, wherein the session control module executes, in response to the session request, the control protocol to exchange control protocol messages with an external server in a protocol session identifiable by the selected protocol session identifier.

In another embodiment, a mobile gateway of a mobile service provider network that provides access to services of one or more packet data networks includes a plurality of forwarding units, and a plurality of subscriber management service units that present a uniform interface to nodes within the mobile service provider network. The mobile gateway also includes a routing unit that executes routing protocols to exchange routing information with network devices. An allocation manager of the routing unit that apportions a protocol session identifier namespace for a data protocol into a plurality of contiguous, non-overlapping protocol session identifier ranges. A resource manager of one of the subscriber management service units that binds a first one of the protocol session identifier ranges to a first one of the forwarding units. A session control module of one of the subscriber management service units that establishes the subscriber session with the subscriber management service unit, wherein the session control module associates a protocol session identifier of the first protocol session identifier range with the subscriber session, wherein, based at least on the binding, the session control module installs context information for the subscriber session to the first forwarding unit to anchor the subscriber session with the first forwarding unit.

In another embodiment, a method of managing subscriber sessions with a mobile gateway of a mobile service provider network includes storing data, with the mobile gateway, that specifies a plurality of contiguous, non-overlapping protocol session identifier ranges for a control protocol. The method also includes executing the control protocol on a plurality of subscriber management service units of the mobile gateway to communicate with a network node in accordance with the control protocol via communication sessions, wherein the communication sessions for each of the subscriber management service units utilize protocol session identifiers within different ones of the session identifier ranges.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
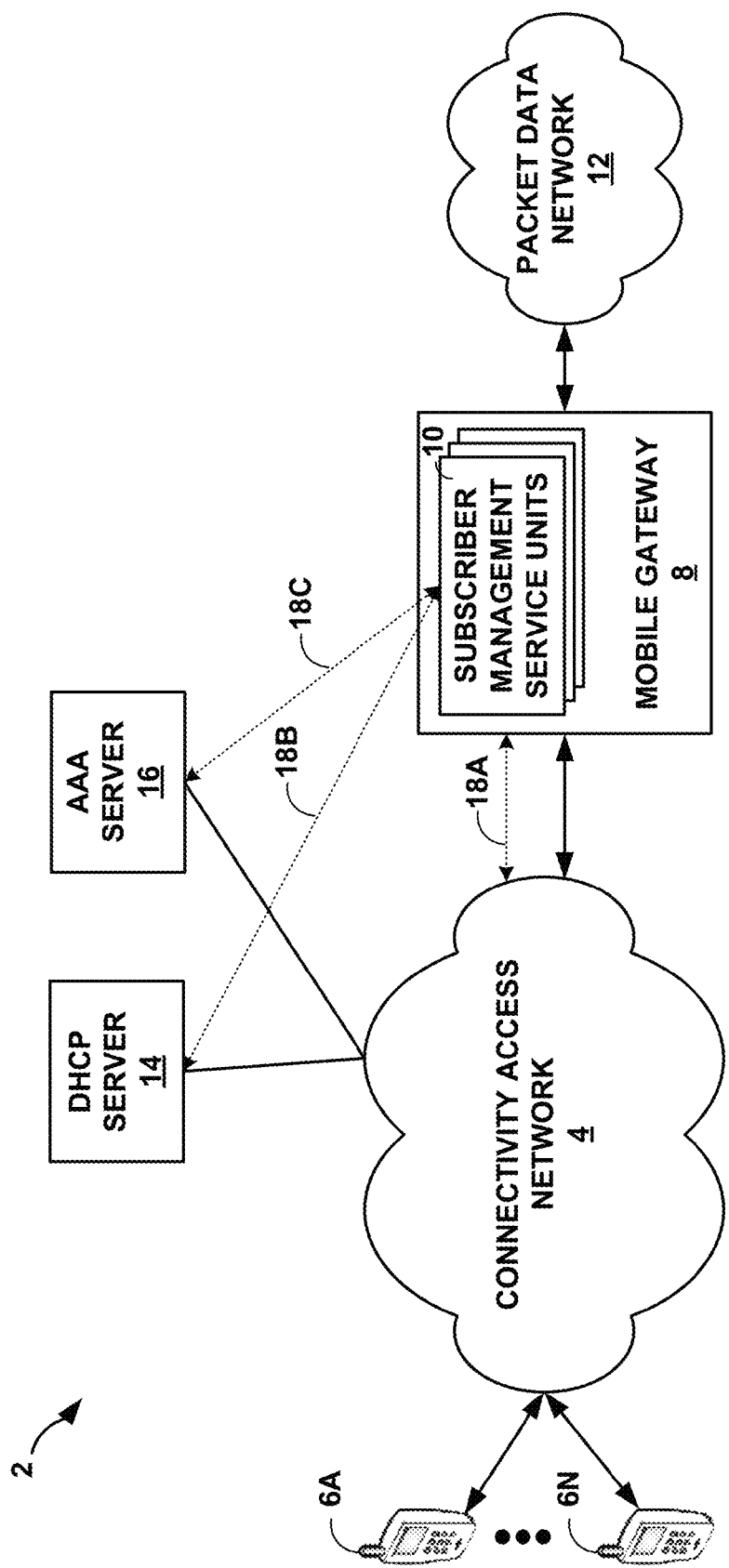
FIG. 1 is a block diagram illustrating an example network system in which a mobile gateway includes a decentralized control plane and aggregates internal routes to facilitate decentralized handling of protocol sessions according to the described techniques.

FIG. 1 is a block diagram illustrating an example network system 2 in which mobile gateway 8 includes a decentralized control plane and aggregates internal routes to facilitate decentralized handling of protocol sessions according to the described techniques. In this example, network system 2 comprises packet data network (PDN) 12 coupled to connectivity access network 4 ("CAN 4") via mobile gateway 8 of CAN 4. Packet data network 12 supports one or more packet-based services that are available for request and use by wireless devices 6A-6N ("wireless devices 6"). As examples, PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates CAN 4, an enterprise IP network, or some combination thereof. Connectivity access network 4 may therefore be alternatively referred to herein as a mobile service provider network. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Each of wireless devices 6 is a wireless communication device for a subscriber (alternatively, a "subscriber device") that may comprise, for example, a mobile telephone, a laptop or desktop computer having, e.g., a 3G/4G wireless card, a wireless-capable netbook, a video game device, a pager, a smart phone, or a personal data assistant (PDA). Each of wireless devices 6 may run one or more applications, such as VoIP clients, video games, videoconferencing, E-mail, and Internet browsers, among others. Certain applications running on wireless device 6 may require access to services offered by PDN 12. Wireless devices 6 may also be referred to, in various architectural embodiments, as User Equipment (UE) or Mobile Stations (MS), and may alternatively be referred to herein as mobile devices.

A service provider operates CAN 4 to provide network access, data transport and other services to wireless devices 6 attached to CAN 4. In general, CAN 4 may implement any commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GPP/2), an Internet Engineering Task Force (IETF) and a Worldwide Interoperability for Microwave Access (WiMAX) forum. For example, CAN 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Connectivity access network 4 may, alternatively or in conjunction with one of the above, implement a Code Division Multiple Access-2000 ("CDMA2000") or Enhanced Data Rates for GSM Evolution (EDGE) architecture. Connectivity access network 4 may, again as an alternative or in conjunction with one or more of the above, implement a WiMAX architecture defined by the WiMAX forum.

In some examples, connectivity access network 4 may comprise a core packet-switched network (not shown in FIG. 1) and one or more radio access networks (also not shown in FIG. 1). A core packet-switched network of CAN 4 may comprise, for example, a general packet radio service (GPRS) core packed-switched network, an IP-based mobile multimedia core network, or an Evolved Packet Core (EPC) or Evolved Packet System (EPS). The core packet-switched network of CAN 4 comprises intermediate devices required to implement the control and data protocols of the particular architectural embodiment of CAN 4, such as Serving GPRS Serving Nodes (SGSNs), Serving Gateways (S-GWs) and Mobility Management Entities (MMEs). Wireless devices 6 communicate with CAN 4 using a wireless communication link to one of the radio access networks of the connectivity access network. Radio access networks of CAN 4 may include, for example, for example, a GSM Radio Access Network (GRAN), a WiMAX radio access network, a UMTS Radio Access Network (UTRAN), and/or an evolution of a UTRAN known as an E-UTRAN. Connectivity access network 4 may further include a backhaul or transport network (not shown) that includes land-based transmission lines, frequently leased by a service provider for the connectivity access network, to transport user and control traffic between wireless devices 6 and mobile gateway 8. The backhaul network also includes network devices such as aggregation devices and routers. Further details of an example connectivity access network for a mobile network are described in U.S. patent application Ser. No. 12/905,771, entitled "COLLECTIVELY ADDRESSING WIRELESS DEVICES," filed Oct. 15, 2010, the entire contents being incorporated herein by reference.

In the example of FIG. 1, mobile gateway 8 is a network device that operates as a gateway to PDN 12 and may comprise, for example, a Gateway GPRS Serving Node (GGSN), an Access Gateway (aGW), or a Packet Gateway (P-GW). Mobile gateway 8 may present a uniform interface to downstream nodes, such as SGSNs, S-GWs, and MMEs, to allow the downstream nodes to address service and/or signaling traffic to the uniform interface rather than separately directing such traffic among multiple devices or multiple control plane entities (e.g., service cards) within a single device. In addition, mobile gateway 8 may present a uniform interface to control plane servers, illustrated in FIG. 1 as Dynamic Host Configuration Protocol (DHCP) server 14 and authentication, authorization, and accounting (AAA) server 16, to allow the control plane servers to address control plane protocol traffic for the various control protocols to the uniform interface rather than separately directing such traffic among multiple devices or multiple control plane entities within mobile gateway 8. In some instances, the uniform interface is an IP address or other network layer address of mobile gateway 8 that is shared among all control plane entities, including subscriber management service units 10. In addition, any one of subscriber management service units 10 may anchor a session for any service (identified, for instance, by an Access Point Name (APN)) for which mobile gateway 8 operates as a gateway.

In some implementations, mobile gateway 8 may be a router that executes routing protocols to identify routes through CAN 4 or PDN 12 to various destinations. While described herein with respect to one or more particular architectures for ease of illustration purposes, CAN 4 may implement any architecture including those set forth by any standards body and those proprietarily owned. Moreover, the techniques may apply to any mobile data protocol supported by these architectures and to any device that implements or otherwise uses such mobile data protocols. For example, the techniques described with respect to mobile gateway 8 may be performed by downstream nodes, such as SGSNs, S-GWs, and MMEs. The techniques therefore should not be limited to cellular architectures referenced to herein and the mobile data protocols supported by these architectures. Mobile gateway 8 and other elements of connectivity access network 4 may, therefore, each represent an abstraction of devices found within any type of mobile network architectures.

Connectivity access network 4 establishes and operates bearers to transport user traffic, in the form of PDP packet data units (PDUs), referred to hereinafter as "packets." In general, a bearer is a set of network resources and data transport functions in CAN 4 to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Any of wireless devices 6 initiates an attach request to attach to CAN 4 to enable service traffic exchange with PDN 12. Connectivity access network 4 notifies mobile gateway 8 of the attach request. Mobile gateway 8 includes a plurality of subscriber management service units 10, any one of which may establish a CAN session for the requesting wireless device 6 by executing control protocols to (1) identify and authenticate the wireless device with AAA server 16, (2) receive PDP address configuration information from DHCP server 14, and (3) communicate with CAN 4 to establish a default bearer to carry user traffic for the requesting wireless device 6.

In general, a CAN session is an association between CAN 4 and any of wireless devices 6 that is identifiable by a combination of a wireless device 6 PDP address and an Access Point Name (APN) for a service provided by PDN 12. That is, the CAN session (hereinafter, "subscriber session" or "session") is a service-specific (as specified by the APN) session for a service provided to the associated one of wireless devices 6. Besides establishing a default bearer, the attach procedure may trigger establishment, by CAN 4, of one or more dedicated bearers between mobile gateway 8 and the requesting wireless device 6 to carry user traffic. In an IP-based connectivity access network 4, a session comprises an IP-CAN session.

Because any of subscriber management service units 10 may establish and operate requested CAN sessions for any of wireless devices 6, each of subscriber management service units 10 may execute all of the control protocols required to establish a CAN session in response to a subscriber request to create or modify the CAN session. For example, DHCP server 14 exchanges, in protocol sessions 18B, address allocation protocol messages with any of subscriber management service units 10 to allocate PDP addresses to wireless devices that attach to CAN 4 to enable wireless devices 6 to communicate with PDN 12. DHCP server 14 may execute DHCP or another address allocation protocol with which to allocate PDP addresses. As another example, AAA server 16 executes a AAA protocol (e.g., Remote Dial-In User Authentication Service (RADIUS) or Diameter) and exchanges, in protocol sessions 18C, AAA protocol messages with any of subscriber management service units 10 to identify and authenticate wireless devices 6 seeking to attach to CAN 4. As a still further example, elements of CAN 4 execute a bearer setup protocol such as GPRS tunneling protocol (control) (GTP-C) and exchange, in protocol sessions 18A, GTP-C messages with any of subscriber management service units 10 to establish and modify bearers for wireless devices 6.

Each of protocol sessions 18A, 18B, and 18C (collectively referred to hereinafter as "protocol sessions 18") may represent one or more protocol sessions. For example, protocol session 18A may represent a plurality of GTP-C sessions between CAN 4 and mobile gateway 8. Herein, the term "protocol session" refers to an instance of a communication exchange between two endpoints that is accomplished by executing and using a protocol with protocol session identifiers to exchange messages that conform to the protocol. A protocol session may be associated with protocol state stored by either or both endpoints.

For any of protocol sessions 18, one of subscriber management service units 10 anchors the protocol session. That is, one of subscriber management service units 10 maintains protocol state and issues, receives, and responds to protocol messages for the protocol session. Furthermore, as explained above, any one of subscriber management service units 10 may execute all of the control protocols required to establish/maintain a CAN session. The identity of the control protocol (e.g., DHCP, RADIUS, GTP-C) is therefore inadequate to identify the anchoring one of service management service units 10 for various control protocol messages received by mobile gateway 8.

In accordance with techniques described herein, mobile gateway 8 internally routes protocol messages for any of protocol sessions 18 to anchoring subscriber management service units 10 for the protocol messages using aggregate routes keyed to contiguous, non-overlapping ranges of protocol session identifiers respectively allocated to the service units. Mobile gateway 8 apportions the respective namespaces of protocol session identifiers for protocol sessions 18A, 18B, and 18C into contiguous, non-overlapping ranges of the namespace and allocates the ranges among subscriber management service units 10. Subscriber management service units 10 draw protocol session identifiers from their allocated ranges for use in establishing protocol sessions 18. A protocol session identifier for one of protocol sessions 18 is therefore associated with not only the protocol session, but also with the anchoring one of subscriber management service units 10 that is allocated the range from which the protocol session identifier is drawn.

The control protocols described above each require that messages conforming to the respective control protocols include a protocol session identifier with which to multiplex multiple protocol sessions over a single communication channel, for instance. For the particular examples described above, the RADIUS protocol executed in some instances by AAA server 16 uses the source User Datagram Protocol (UDP) port of UDP datagrams that carry RADIUS protocol messages to select among multiple RADIUS protocol sessions with mobile gateway 8. Mobile gateway 8 may therefore apportion the 16-bit source UDP port namespace (or a subset thereof) into a plurality of source UDP port ranges and allocate the ranges among subscriber management service units 10 for use in establishing and performing protocol sessions 18C. DHCP executed by DHCP server 14 uses a transaction identifier field in DHCP protocol messages to select among multiple DHCP protocol sessions with mobile gateway 8. Mobile gateway 8 may therefore apportion the transaction identifier namespace (or a subset thereof) into a plurality of transaction identifier ranges and allocate the ranges among subscriber management service units 10 for use in establishing and performing protocol sessions 18B. GTP-C uses tunnel endpoint identifiers (TEIDs) embedded within GTP-C messages to select among multiple GTP-C sessions in which an endpoint such as mobile gateway 8 participates. Mobile gateway 8 may therefore apportion the GTP-C TEID namespace (or a subset thereof) into TEID ranges and allocate the TEID ranges among subscriber management service units 10 for use in establishing and performing protocol sessions 18A.

To properly route control protocol messages for protocol sessions 18 to the respective anchoring one of subscriber management service units 10 for the protocol sessions, mobile gateway 8 generates and installs aggregate routes for the allocated protocol session identifier ranges. An aggregate route prefix or "key" specifies one of the allocated protocol session identifier ranges for one of the control protocols. Aggregate routes resolve to the subscriber management service unit that is allocated the protocol session identifier range specified in the aggregate route key. As a result, mobile gateway 8 may apply the aggregate routes to protocol session identifiers carried within incoming protocol sessions 18 traffic to route the traffic to the appropriate subscriber management service units 10 anchoring the sessions.

Allocating ranges of protocol session identifiers to associate corresponding ranges of protocol sessions with respective, anchoring subscriber management service units 10 in this manner may significantly reduce the number of routes required by mobile gateway 8 to support a large number of subscriber service sessions over CAN 4. The techniques, by reducing the attendant forwarding state required to support the decentralized control plane embodied by subscriber management service units 10, facilitates decentralized protocol session handling by the subscriber management service units 10 by permitting the anchoring service unit for a protocol session to be identified on the basis of a protocol session identifier, rather than on the basis of a separate network address for each service unit or on the basis of the protocol type (e.g., DHCP). As such, the techniques may also enable subscriber management service units 10 to be addressed by a common network address and also support all of the control protocols required to support service session establishment and management. This advantage may simplify both mobile gateway 8 and CAN 4 configuration, as well as reduce inter-subscriber management service units 10 routing within mobile gateway 8 by centralizing control protocol messages for a particular service session within a single service unit.

Figure 2:
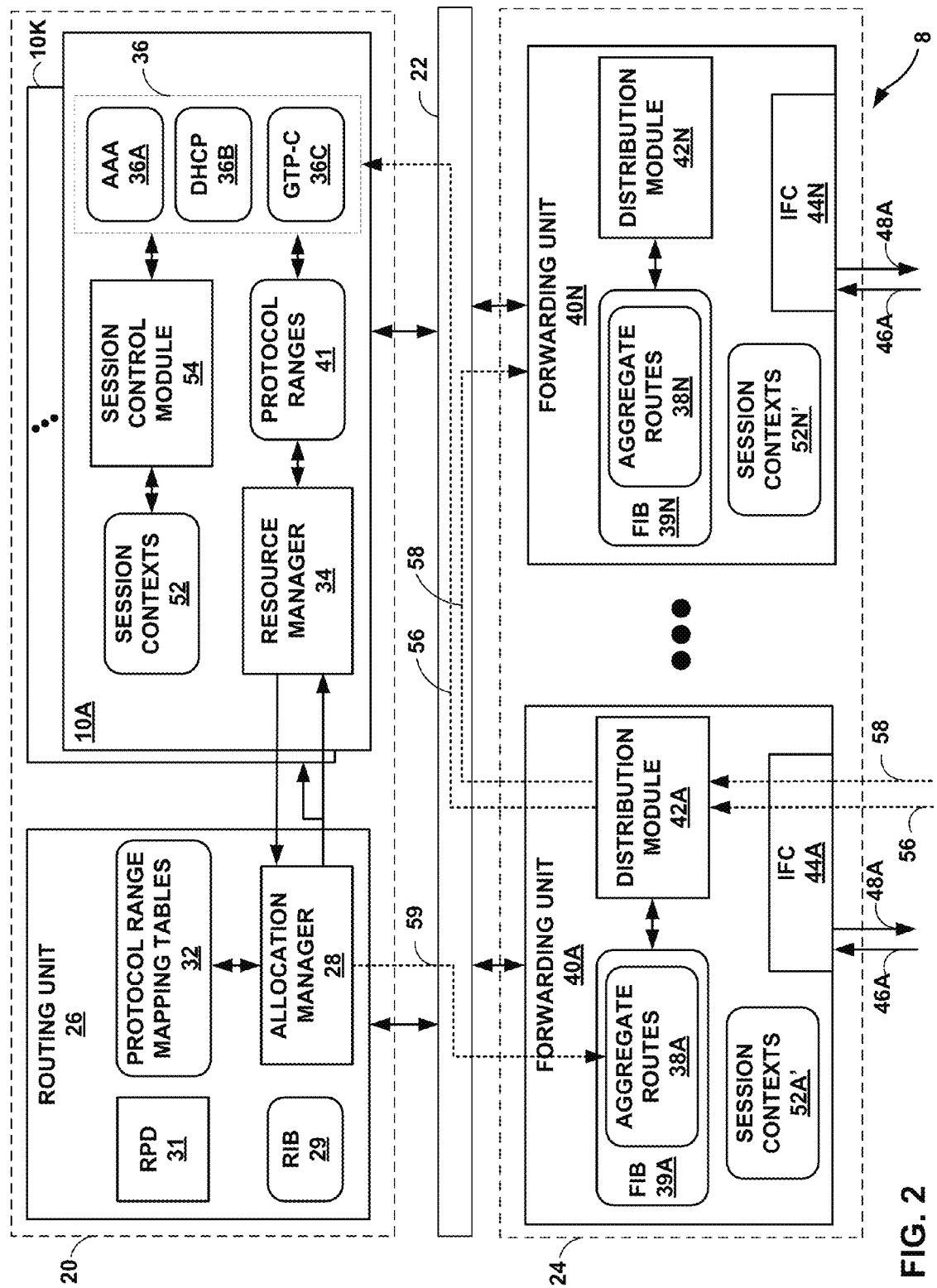
FIG. 2 is a block diagram illustrating, in further detail, an example embodiment of the mobile gateway of FIG. 1 that performs internal route aggregation and protocol traffic distribution according to techniques described herein.

FIG. 2 is a block diagram illustrating, in further detail, an example embodiment of mobile gateway 8 of FIG. 1 that performs internal route aggregation and protocol traffic distribution according to techniques described herein. In this example, mobile gateway 8 is divided into two logical or physical "planes" to include a first control plane 20 and a second "data" or "forwarding" plane 24. That is, mobile gateway 8 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software to implement the functionality.

Control plane 20 is a decentralized control plane in that control plane functionality is distributed among routing unit 26 and a plurality of subscriber management service units 10A-10K ("subscriber management service units 10"). Similarly, data plane 24 in this example is a decentralized data plane in that data plane functionality and packet forwarding functionality is distributed among a plurality of forwarding units 40A-40N ("forwarding units 40"). In some instances, packet forwarding functionality may be consolidated in a single forwarding unit. Each of routing unit 26, subscriber management service units 10, and forwarding units 40 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 26, subscriber management service units 10, and forwarding units 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 22 couples routing unit 26, subscriber management service units 10, and forwarding units 40 to deliver data units and control messages among the units. Switch 22 may represent an internal switch fabric or cross-bar, bus, or link. Examples of high-speed multi-stage switch fabrics used as a data plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

Data plane 24 represents hardware or a combination of hardware and software that forward network traffic in accordance with forwarding information. In the example mobile gateway 8 of FIG. 2, data plane 24 includes forwarding units 40 that provide high-speed forwarding of network traffic received by interface cards 44A-44N ("IFCs 44") via inbound links 46A-46N to outbound links 48A-48N. Forwarding units 40 receive and forward control and data packets via switch 22 along internal forwarding paths to anchoring units for the control and data packets. Forwarding units 40 may each comprise one or more packet forwarding engines ("PFEs") coupled to respective interface cards 44 and may each represent, for example, a dense port concentrator (DPC), modular port concentrator (MPC), flexible physical interface card (PIC) concentrator (FPC), or another line card, for example, that is insertable within a mobile gateway 8 chassis or combination of chassis. Each of forwarding units 40 may include substantially similar components to perform substantially similar functionality, said components and functionality being described hereinafter with respect to forwarding unit 40A.

Forwarding unit 40A includes a distribution module 42A receives control and data session traffic via IFC card 44A and internally forwards the traffic to the anchoring one of subscriber management service units 10 (control traffic) or to the anchoring one of forwarding units 40 (data traffic) according to internal routes installed to forwarding information base 39A, including aggregate routes 38A. As described in further detail below, aggregate routes 38A may be installed by protocol range allocation manager 28 upon apportioning and allocating protocol session identifier namespaces for various control and/or data protocols.

Routing unit 26 of control plane 20 executes the routing functionality of mobile gateway 8. In this respect, routing unit 26 represents hardware or a combination of hardware and software of control that implements with routing protocol daemon 31 ("RPD 31") routing protocols by which routing information, stored in a routing information base 29 ("RIB 29"), may be exchanged with other routers. RIB 29 may include information defining a topology of a network, such as CAN 4 and/or PDN 12 of FIG. 1. RPD 31 may resolve the topology defined by routing information in RIB 29 to select or determine one or more routes through the network. RPD 31 may then update data plane 24 with these routes, where forwarding units 40 of data plane 24 store these routes in respective forwarding information bases 39A-39N ("FIBs 39"). Further details of one example embodiment of a router can be found in U.S. patent application Ser. No. 12/182,619, filed July 30, entitled "STREAMLINED PACKET FORWARDING USING DYNAMIC FILTERS FOR ROUTING AND SECURITY IN A SHARED FORWARDING PLANE," which is incorporated herein by reference.

Protocol range allocation manager 28 ("allocation manager 28") of routing unit 26 apportions the respective namespaces of protocol session identifiers for data and control protocols 36, each executed and/or managed by subscriber management service units 10, into one or more contiguous, non-overlapping ranges for use by subscriber management service units 10 in establishing and distinguishing both data and control protocol sessions. Allocation manager 28 may apportion and allocate all or only a part of a protocol session identifier namespace. Protocol range mapping tables 32 include one or more associative data structures that each associate apportioned ranges of protocol session identifiers for a particular one of protocols 36 with respective service units 10 or forwarding units 40 to which allocation manager 28 has either: (1) allocated the range or (2) received binding information from subscriber management service units 10. In the case of control protocols 36 managed by subscriber management service units 10, protocol range mapping tables 32 include corresponding associative data structures that bind control protocol session identifier ranges with respective, anchoring subscriber management service units 10 for the ranges. Example control protocols illustrated in FIG. 2 include AAA 36A (representing, e.g., RADIUS or Diameter), DHCP 36B, and GTP-C 36C. In the case of data protocols, such as GTP-U and Internet Protocol (IP), protocol range mapping tables 32 include corresponding associative data structures that bind data protocol session identifier ranges with respective, anchoring forwarding units 40 for the ranges. For each of the protocols, allocation manager 28 may both allocate protocol ranges and record the associations between ranges and anchoring service/forwarding units to which the ranges are allocated. Alternatively, allocation manager 28 may receive binding information from subscriber management service units 10 that associates ranges of data protocol session identifiers, allocated by allocation manager 28, that the subscriber management service units 10 have bound to respective forwarding units 40 to identify the anchoring forwarding units for the ranges. Allocation manager 28 stores associations of protocol session identifier ranges and anchoring units to protocol range mapping tables 32. Because data protocol session identifiers identify a subscriber session for the data protocol, they may be alternatively referred to herein as subscriber session identifiers.

For example, as described above, AAA 36A uses the source User Datagram Protocol (UDP) port of UDP datagrams that carry AAA protocol messages to distinguish among multiple protocol sessions. Allocation manager 28 may therefore apportion the 16-bit source UDP port namespace (or a subset thereof) into a plurality of source UDP port ranges and allocate the ranges among subscriber management service units 10 for use in establishing and executing AAA 36A protocol sessions. In some instances, allocation manager 28 apportions the UDP port namespace into 1K ranges. As another example, DHCP 36B uses a transaction identifier field in DHCP protocol messages to distinguish among multiple DHCP protocol sessions. Allocation manager 28 may therefore apportion the transaction identifier namespace (or a subset thereof) into a plurality of transaction identifier ranges and allocate the ranges among subscriber management service units 10 for use in establishing and executing DHCP 36B protocol sessions. In some instances, allocation manager 28 apportions the transaction identifier namespace into 1K ranges. As a still further example, GTP-C uses tunnel endpoint identifiers (TEIDs) embedded within GTP-C messages to select among multiple GTP-C tunnels for which any of subscriber management service units 10 may be an endpoint. Allocation manager 28 may therefore apportion the 32-bit GTP-C TEID namespace (or a subset thereof) into TEID ranges and allocate the TEID ranges among subscriber management service units 10 for use in establishing GTP-C tunnels using GTP-C 36C. In some instances, allocation manager 28 apportions the GTP-C TEID namespace into 4M ranges.

Allocation manager 28 may be statically configured, by an administrator or other entity using a management interface, with information describing subscriber management service units 10 such as the number of service units as well as respective capacities of the individual service units (e.g., the number of sessions that the service unit is able to anchor). Allocation manager 28 may also be statically configured, by an administrator or other entity using a management interface, with protocol session identifiers for various protocols for apportionment and allocation. Allocation manager 28 may also receive resource-related information from subscriber management service units 10 that describes respective dynamic session loads being currently anchored by the service units and/or forwarding units 40. As a result, allocation manager 28 may allocate apportioned protocol session identifier ranges dynamically based upon the dynamic session loads being currently anchored by subscriber management service units 10. In some instances, as described below in detail, subscriber management service units 10 may receive load information advertised by allocation manager 28 and bind data protocol session identifier ranges to respective forwarding units 40 dynamically based upon the dynamic session loads being currently anchored by forwarding units 40.

Subscriber management service units 10 of control plane 20 present a uniform interface to subscriber devices and provide decentralized service session setup and management for mobile gateway 8. For example, all of subscriber management service units 10 may be addressable by the same IP or other PDP address, and control messages destined for the same IP or other PDP address of subscriber management service units 10 may therefore be handled by any of the service units. Internally, each of subscriber management service units 10 may include a unique identifier that identifies the service unit to other components of mobile gateway 8. Subscriber management service units 10 identifiers may include, for example, an index, slot, identifying string, internal IP address, or link layer address. Subscriber management service units 10 may each represent, for example, a packet forwarding engine (PFE) or other component of a physical interface card insertable within one or more chassis of mobile gateway 8. The physical interface card may be, for instance, a multi-services dense port concentrator (MS-DPC). One or more of subscriber management service units 10 may also each represent a co-processor executing on a routing node, such as routing unit 26. Subscriber management service units 10 may be alternatively referred to as "service PICs" or "service cards." Each of subscriber management service units 10 includes substantially similar components to perform substantially similar functionality, said components and functionality being described hereinafter with respect to subscriber management service unit 10A (hereinafter, "service unit 10A").

Session control module 54 of service unit 10A establishes sessions requested by a connectivity access network in which mobile gateway 8 is located and manages the sessions once established. Each of subscriber management service units 10 includes an instance of session control module 54 and may therefore independently execute control plane protocols 36 required to establish a requested session for a subscriber. In this sense, the subscriber management service units 10 provide a form of a decentralized control plane for managing subscriber communication sessions. As a result, the mobile gateway 8 may achieve increased scalability to handle thousands or millions of concurrent communication sessions from mobile devices.

Resource manager 34 operates as an interface for service unit 10A to routing unit 26 and, in particular, to allocation manager 28. That is, resource manager 34 receives protocol session identifier ranges allocated by allocation manager 28 and stores the ranges to protocol ranges 41. Protocol ranges 41 constitute one or more protocol-specific pools of ranges allocated to service unit 10A that session control module 54 may use as protocol session identifiers for session generation and execution for corresponding protocols. For instance, resource manager 34 may receive and install to protocol ranges 41 one or more protocol session identifier ranges for AAA 36A, one or more protocol session identifier ranges for DHCP 36B, and one or more protocol session identifier ranges for GTP-C 36C. In addition, resource manager 34 may receive and install data protocol session identifiers to protocols ranges 41, including for instance one or more protocol session identifier ranges for IP (i.e., IP addresses) and one or more protocol session identifier ranges for GTP-U (i.e., TEIDs). Protocol ranges 41 may include one or more tables or other data structures to store the ranges. Protocol ranges 41 may store each range as a list of protocol session identifiers, using boundaries of the range, or using an initial protocol session identifier for the range and the range length, for example.

Session control unit 54 receives requests to create or update subscriber sessions and responsively creates or updates the sessions by executing control protocols 36 using unused protocol session identifiers stored by protocol ranges 41. For example, service unit 10A may receive a request to create a subscriber session from a subscriber, such as a Create Session Request message transmitted by a Serving Gateway (S-GW) to mobile gateway 8 operating as a PGW of an EPC of an LTE network or a Create PDP Context Request transmitted by an SGSN to mobile gateway 8 operating as a GGSN of a GPRS packet-switched network. If all protocol session identifiers in protocol ranges 41 for a particular protocol are in use by service unit 10A, session control module 54 may direct resource manager 34 to request an additional protocol session identifier range for the protocol from allocation manager 28.

A session context stored in session contexts 52 for a session in which a wireless device participates may store session context information including, for example, the PDP (e.g., IP) address allocated by a DHCP server or another entity for the wireless device for use in sending and receiving subscriber packets, forwarding information used by forwarding units 40 in forwarding subscriber packets such as tunnel endpoint identifiers (TEIDs) and identifiers/addresses for downstream nodes, the Access Point Name (APN) for the session, charging information, and one or more quality of service (QoS) profiles for the associated subscriber.

To create and anchor the requested session in session contexts 52, session control module 54 authenticates and receives profile information for a subscriber and/or subscriber service identified in the request by executing a AAA 36A protocol session that makes use of a UDP port included within a protocol session identifier range for AAA 36A that is stored by protocol ranges 41. Session control module 54 may also request an IP address from a DHCP server for the requested session by executing a DHCP 36B protocol session that makes use of a transaction identifier included within a protocol session identifier range for DHCP 36B that is stored by protocol ranges 41. Session control module 54 may also negotiate with other connectivity access network devices, using GTP-C 36C messages, to create or modify a set of one or more bearers that carry service traffic for the requested session in GTP-U tunnels. Session control module 54 provides a TEID in the GTP-C 36C messages that is drawn from a protocol session identifier range for GTP-C 36C that is stored by protocol ranges 41. In this way, session control module 54 establishes or updates session contexts 52 using well-defined protocol session identifiers for protocols 36 that are specifically allocated by allocation manager 28 to service unit 10A. These control protocols are exemplary, and the techniques are applicable to other control protocols having a protocol session identifier namespace, such as control protocols for communicating with a charging and policy server.

In accordance with techniques of this disclosure and to ensure that messages associated with protocol 36 sessions reach the respective subscriber management service units 10 that anchor the protocol 36 sessions, allocation manager 28 installs aggregate routes for protocol session identifier ranges to aggregate routes 38 of forwarding units 40. An aggregate route specifies an internal forwarding path for a contiguous, non-overlapping range of allocated protocol session identifiers for any of control protocols 36 or any data protocols. In the illustrated embodiment, allocation manager 28 installs to aggregate routes 38A an aggregate route that keys a range of protocol session identifiers to a particular one of subscriber management service units 10 using aggregate route installation message 59. Aggregate route installation message 59 may be transmitted via switch 22 using TCP/IP. Aggregate routes installed to aggregate routes 38 may be representations of aggregate routes installed to RIB 29.

As one example, allocation manager 28 may install an aggregate route to each of aggregate routes 38 that keys a range of UDP ports to service unit 10A for internally routing AAA 36A protocol session messages. As another example, allocation manager 28 may install an aggregate route to each of aggregate routes 38 that keys a range of transaction identifiers to service unit 10A for internally routing DHCP 36B protocol session messages. Forwarding unit 40A may store aggregate routes 38A as a lookup tree or table that may be lookup primitive for a chained next hop of an internal forwarding path. Example details on internal forwarding paths of forwarding units 40 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

Distribution module 42A receives control protocol session traffic and may internally route the traffic, in accordance with the techniques described herein, using aggregate routes 38A to anchoring subscriber management service units 10 for the corresponding protocol sessions. For traffic received, distribution module 42A determines a protocol and protocol session identifier for the traffic, determines a matching one of aggregate routes 38A for the protocol session identifier, and internally routes the traffic to the one of subscriber management service units 10 specified by the determined aggregate route. The matching one of aggregate routes 38A includes a range of key values that are protocol session identifiers for the determined protocol. The range includes the protocol session identifier determined for the traffic. Subscriber traffic for a session may be associated within forwarding unit 40A to a traffic flow such that individual packets may be routed based at least on an association with the traffic flow, which is itself associated with the determined route. Distribution module 42A may be implemented using a forwarding ASIC.

In the illustrated example, IFC card 44A receives control protocol message 56 on inbound interface 46A and forwards the message to distribution module 42A. Distribution module 42A, in turn, determines a protocol and a protocol session identifier of the message. Distribution module 42A then keys the protocol and protocol session identifier to aggregate routes 38A to determine a matching one of aggregate routes 38A and forwards, via switch 22, control protocol message 56 to the subscriber management service unit specified by the aggregate route, which in this example is service unit 10A.

By allocating ranges of protocol session identifiers to facilitate route aggregation and by forwarding control protocol messages among a plurality of subscriber management service units using aggregated routes, the techniques may substantially reduce the number of routes required to internally route control protocol session traffic. Because any of forwarding units 40 may receive messages for control protocol sessions, each of the forwarding units 40 requires routes for each of the sessions to specify the respective anchoring one of subscriber management service units 10. Rather than installing a new route to each of forwarding units 40 responsive to the initiation of each new control protocol session having a unique protocol session identifier, allocation manager 28 installs an aggregate route that keys to a range of protocol session identifier pre-allocated to the next hop (i.e., the anchoring subscriber management service unit) for the route. This route reduction leads to a substantial decrease in the amount of forwarding state that would otherwise be installed to forwarding units 40 and increases the scalability of mobile gateway 8 for concurrently handling many thousands or millions of subscriber sessions.

As control plane anchors for subscriber sessions, subscriber management service units 10 handle configuration of forwarding units 40 for constructing subscriber-specific forwarding paths for processing and forwarding data traffic from the mobile devices. For example, session control module 54 executes control protocols 36 to create or modify session contexts 52 that include data protocol session identifiers. Session control module 54 may program session contexts 52 to forwarding units 40 for storage in respective session contexts 52A'-52N' ("session contexts 52'") and use by forwarding units 40 in forwarding associated subscriber packets.

Forwarding unit 40A, for instance, receives subscriber packets, maps the subscriber packets to a session context in session contexts 52A', and applies forwarding constructs to forward the subscriber packets according to the session context data. For example, forwarding of downstream subscriber packets by forwarding unit 40A for a particular session may include encapsulating the subscriber packets using GTP and setting the specified downstream TEID for the session within a GTP-U header. Forwarding of upstream subscriber packets by forwarding unit 40A for a particular session may include decapsulating the subscriber packets of GTP-U headers, mapping the upstream TEID to one of session contexts 52A', and forwarding the subscriber packets according to the mapped session context. Any one of forwarding units 40 may operate as an anchoring forwarding unit for a session context to perform forwarding functionality on subscriber packets associated with the session. In other words, subscriber traffic for each of session contexts 52 is handled by a different one of forwarding units 40 (i.e., the anchor forwarding unit). The anchor forwarding unit for subscriber traffic may be different than the ingress or egress forwarding unit for the subscriber traffic. The respective anchor forwarding units for upstream and downstream subscriber traffic for a subscriber session may be the same forwarding unit or different forwarding units. Example details on subscriber management service units 10 constructing subscriber-specific forwarding paths within forwarding units 40 can be found in U.S. patent application Ser. No. 13/172,505, referenced above.

In addition to or alternatively to control protocols 36 mentioned above, allocation manager 28 may in some instances apportion and allocate protocol session identifiers for data protocols that forwarding units 40 use to forward packets. For instance, GTP-U uses TEIDs embedded within GTP-U packets to identify GTP-U tunnels that may be associated with a particular session context for a subscriber. Allocation manager 28 may therefore apportion the GTP-U TEID namespace (or a subset thereof) into TEID ranges and allocate the TEID ranges among subscriber management service units 10 for use in establishing GTP-U tunnels that are implemented by forwarding units 40. In some instances, allocation manager 28 allocates GTP-U TEID ranges of size 64K. Similarly, IPv4 and IPv6 use network addresses to identify network destinations. Mobile gateway 8 may associate IP addresses allocated for respective subscribers with session contexts for the subscribers to tie subscriber bearers to the subscriber IP address and thus permit traffic relay by forwarding unit 40 at the mobile service provider network boundary. In some instances, routing unit 26 maintains a pool of IP addresses for local assignment to subscriber devices via subscriber management service units 10. Allocation manager 28 may apportion this pool into a plurality of IP address "chunks" (i.e., IP session identifier ranges) for run-time, selective allocation among subscriber management service units 10. In some instances, allocation manager 28 allocates IP address chunks of size 1K.

Resource manager 34 requests and receives data protocol session identifier ranges from allocation manager 28 and stores the data protocol session identifier ranges to protocol ranges 41. Resource manager 34 may request additional data protocol session identifier ranges as needed, that is, as session control module 54 exhausts protocol ranges 41. Session control module 54 uses unused data protocol session identifiers stored in protocol ranges 41 to establish and modify session contexts 52. For example, upon receiving a request to create a subscriber session from a subscriber, session control module 54 may use an GTP-U TEID and/or an IP address in protocol ranges 41 in creating the session context for the requested subscriber session.

Session control module 54 selects one of forwarding units 40 to anchor session contexts associated with protocol session identifiers that fall within a data protocol session identifier range in protocol ranges 41. For example, resource manager 34 may request and receive from allocation manager 28 a new data protocol session identifier range that resource manager 34 stores to protocol ranges 41. When session control module 54 uses, for the first time, a protocol session identifier of the new data protocol session identifier range in establishing or modifying one of session contexts 52, resource manager 34 selects one or forwarding units 40 to anchor session contexts associated with the new data protocol session identifier range. Resource manager 34 binds the selected one of forwarding units 40 to the new data protocol session identifier range such that session control module 54 directs the selected forwarding unit to anchor subscriber sessions that make use of protocol session identifiers in the range. In some instances, resource manager 34 receives dynamic session load information advertised by routing unit 26 or other subscriber management service units 10. Resource manager 34 may select a least-loaded one of forwarding units 40 when binding a new data protocol session identifier range. This may reduce a probability of overloading forwarding units 40.

Upon binding a data protocol session identifier range to one of forwarding units 40, resource manager 34 advertises the binding information to allocation manager 28. The binding information associates a data protocol session identifier range with the anchoring one of forwarding units 40 bound to the range. Allocation manager 28 generates an aggregate route based at least on the binding information and may store the aggregate route to RIB 29. In the case of IP address chunks, this may include storing the aggregate route to the met routing table. An aggregate route for a data protocol specifies the anchoring one of forwarding units 40 as a next hop for a contiguous, non-overlapping range of protocol session identifiers for the data protocol that is bound to the forwarding unit. Allocation manager 28 installs aggregate routes for bound data protocol session identifiers to each of aggregate routes 38. Aggregate routes 38 may specify matching traffic as subscriber data traffic to be handled using a subscriber or logical interface (IFL).

As one example, allocation manager 28 may install an aggregate route to each of aggregate routes 38 that keys a range of GTP-U TEIDs identifying GTP tunnels for subscriber bearers to forwarding unit 40A. As another example, allocation manager 28 may install an aggregate route to each of aggregate routes 38 that keys a range of IP addresses to forwarding unit 40N.

Distribution module 42A receives subscriber traffic and may internally route the traffic, in accordance with the techniques described herein, using aggregate routes 38A to forwarding units 40 that anchor the respective subscriber sessions associated with the traffic. Forwarding units 40 may receive subscriber traffic on an SGi/Gi or SGn/Gn interface, for example. For traffic received, distribution module 42A determines a data protocol and protocol session identifier for the traffic, determines a matching one of aggregate routes 38A for the data protocol and protocol session identifier, and internally routes the traffic to the one of forwarding units 40 specified by the determined aggregate route. The matching one of aggregate routes 38A includes a range of key values that are protocol session identifiers for the determined protocol. The range includes the protocol session identifier determined for the traffic. Subscriber traffic for a session may be associated within forwarding unit 40A to a traffic flow such that individual packets may be routed based at least on an association with the traffic flow, which is itself associated with the determined route. Distribution module 42A may be implemented using a forwarding ASIC.

In the illustrated example, IFC card 44A receives subscriber traffic 58 on inbound interface 46A and forwards the message to distribution module 42A. Distribution module 42A, in turn, determines a protocol and a protocol session identifier of the message. Distribution module 42A then keys the protocol and protocol session identifier to aggregate routes 38A to determine a matching one of aggregate routes 38A and forwards, via switch 22, subscriber traffic 58 to the forwarding unit specified by the aggregate route, which in this example is forwarding unit 40N.

In some instances, subscriber management service units 10 receive IP addresses allocated to respective subscriber devices by an external server, such as DHCP server 14 of FIG. 1. Allocation manager 28 may not maintain a pool of IP addresses for allocation, or at least the pool of IP addresses does not encompass those addresses that are allocated by the external server. In such instances, allocation manager 28 nevertheless apportions the IP address space (or a subset thereof) into a plurality of IP address chunks. This may cause multiple subscriber management service units 10 to receive IP addresses (allocated to corresponding subscriber devices) that fall within a single IP address chunk. Accordingly, allocation manager 28 does not allocate the IP address chunks to subscriber management service units 10. Allocation manager 28 instead advertises binding information that associates IP address chunks with forwarding units 40 to resource manager 34 (as well as to other resource managers of other subscriber management service units 10), which stores the binding information to protocol ranges 41. That is, protocol ranges 41 in these instances stores associations between IP address chunks and forwarding units 40, if any, to which the IP address chunks are bound. If an IP address chunk is not yet bound to any of forwarding units 40, protocol ranges 41 associates the IP address chunk to a null value or other suitable indicator.

During subscriber session creation or modification, when service unit 10A receives an IP address, allocated to a subscriber device by an external server, that is a member of an IP address chunk that is not yet bound to any of forwarding unit 40, resource manager 34 selects one of forwarding unit 40 in accordance with the forwarding unit selection techniques described above. Resource manager 34 binds the IP address chunk for the IP address to the selected forwarding unit, and session control module 54 installs the session context for the new or modified subscriber session to the selected forwarding unit that now anchors the session. Resource manager 34 additionally notifies allocation manager 28 with binding information that associated the IP address chunk with the selected one of forwarding units 40. Allocation manager 28, in turn, advertises the binding information to each of subscriber management service units 10, which stores the binding information to protocol ranges 41. Allocation manager 28 also generates and installs an aggregate route for the IP address chunk to each of aggregates routes 38 according to the route generation and installation techniques described above.

Thereafter in such instances, session control module 54 that receives, via a control protocol 36 session for creating or modifying a subscriber session, another IP address for the IP address chunk queries protocol ranges 41 to determine the bound, anchoring one of forwarding units 40 for the IP address chunk. Session control module 54 installs the session context for the subscriber session to session contexts 52 of the anchoring forwarding unit 40. As before, reference to components of service unit 10A refers also to substantially similar components of other subscriber management service units 10.

Because subscriber management service units 10 do not control the allocation of at least a portion of IP addresses to subscriber devices in these instances, the subscriber management service units may be unable to manage session load on forwarding units 40 according to dynamic session load information. For example, session control module 54 may receive allocated IP addresses from an external server that fall within a number of different IP address chunks. Resource manager 34 is unable to predict future allocation of IP addresses, and binds the number of IP address chunks to various forwarding units 40. Future IP address allocations may be drawn more heavily from certain IP address chunks than others, which may cause session control module 54 (operating according to binding information in protocol ranges 41) to fully utilize the session load capacity of one of forwarding units 40.

In these cases, session control module 54 is unable to anchor additional subscriber sessions with the fully loaded forwarding unit. When session control module 54 creates a new subscriber session that would be anchored, in accordance with previous bindings, at an overloaded one of forwarding units 40, resource manager 34 selects a different forwarding unit 40 to anchor the subscriber session. Resource manager 34 binds the IP address for the new subscriber session to the selected forwarding unit 40 and provided the binding information to allocation manager 28. In this case, the binding information binds a single IP address with the selected forwarding unit 40 for the address. Allocation manager 28 installs a route for the IP address (e.g., a/32 route per IPv4 or a/128 route per IPv6) to FIBs 39, which corresponding distribution modules 42 use to internally route subscriber traffic destined for the IP address to the selected forwarding unit 40. These techniques permit continued flexibility for anchoring subscriber sessions among forwarding units 40 in conjunction with aggregated routing techniques.

As with aggregate routes for control protocol session identifiers, allocating ranges of subscriber session identifiers (e.g., IP addresses and GTP-U TEIDs) to facilitate route aggregation and forwarding subscriber traffic among forwarding units 40 using aggregated routes may substantially reduce the number of routes required to internally route subscriber traffic. Because any of forwarding units 40 may receive subscriber traffic for any of a number of subscriber sessions, each of the forwarding units 40 requires routes for each of the subscriber sessions to specify the respective anchoring one of forwarding units 40. Rather than installing a new route to each of forwarding units 40 to specify an anchoring forwarding unit for each subscriber session, allocation manager 28 installs an aggregate route that keys to a range of subscriber session identifiers bound by subscriber management service units 10 to the next hop (i.e., the anchoring forwarding unit) for the route. Reducing the number of routes may lead to a substantial decrease in the amount of forwarding state that would otherwise be installed to forwarding units 40 and increases the scalability of mobile gateway 8 for concurrently handling many thousands or millions of subscriber sessions.

Figures 3A, 3B:
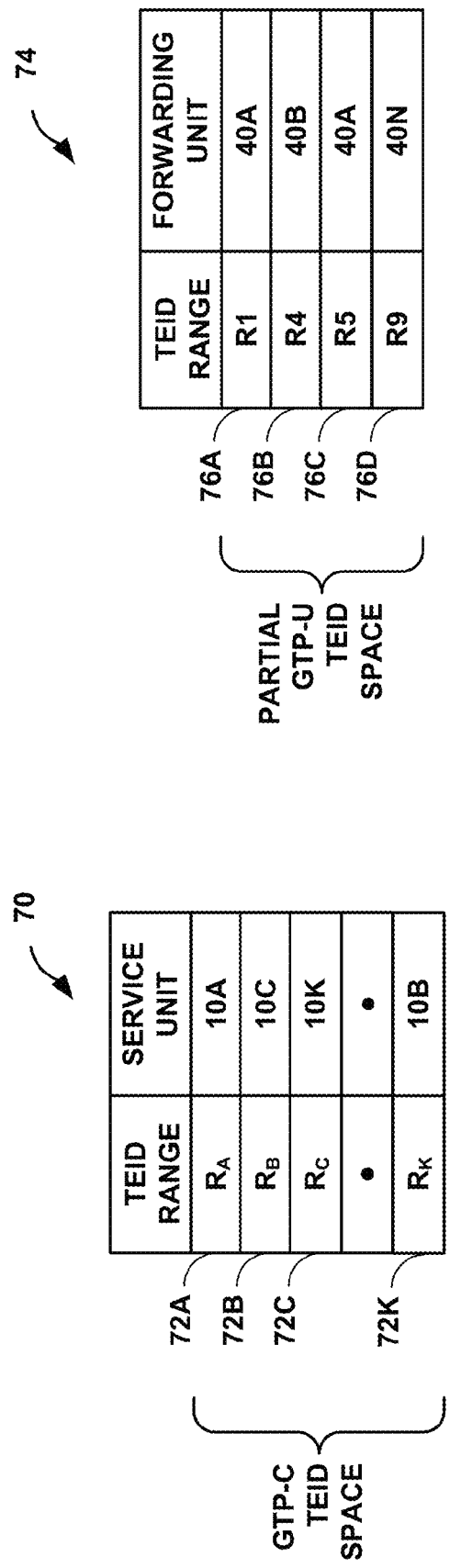
FIGS. 3A-3B are block diagrams illustrating lookup tables that stores aggregate routes generated by a decentralized control plane and installed to a forwarding unit in accordance with techniques described in this disclosure.

FIG. 3A is block diagram illustrating a lookup table 70 that stores aggregate routes generated and installed to a forwarding unit in accordance with techniques described in this disclosure. Lookup table 70 maps protocol session identifier ranges to respective subscriber management service units 10 of mobile gateway 8. Lookup table 70 may represent a lookup primitive for an internal forwarding path of one of forwarding units 40 of FIG. 2. In this example, lookup table 70 is a lookup table for GTP-C. Lookup table 70 may represent all or a subset of aggregate routes 38A of FIG. 2. Aggregate routes 72A-72K ("aggregate routes 72") each include, as a lookup key, a range of TEIDs drawn from the GTP-C TEID namespace. That is, the GTP-C TEID namespace is apportioned into K contiguous, non-overlapping ranges $R_A$-$R_K$ of TEIDs. The ranges may be of equal size or may apportioned differently in accordance with respective control plane subscriber anchoring capacities of the various subscriber management service units. The combination of ranges may represent the entire GTP-C TEID namespace.

Each of aggregate routes 72 includes, as a next hop result for a matching lookup operation, the identifier or address of one of subscriber management service units 10 to which the aggregate route is allocated by the control plane of mobile gateway 8. As explained above, a centralized allocation manager 28 may direct the allocation of protocol session identifier ranges to subscriber management service units 10. A forwarding unit 40 that receives control plane traffic for mobile gateway 8 determines a control protocol of the traffic. If the control protocol is GTP-C, i.e., the control plane traffic includes a GTP-C header, the forwarding unit 40 determines and keys the GTP-C TEID for the control plane traffic to lookup table 70 for GTP-C. The forwarding unit 40 then directs the control plane traffic to the next hop result of the one of aggregate routes 72 that includes a TEID range that includes the GTP-C TEID for the control plane traffic. Forwarding units 40 may include a similar, corresponding lookup table that maps other types of control protocol session identifier ranges to respective anchoring subscriber management service units 10 for the ranges.

FIG. 3B is block diagram illustrating a lookup table 74 that stores aggregate routes generated and installed to a forwarding unit in accordance with techniques described in this disclosure. Lookup table 74 maps protocol session identifier ranges to respective subscriber management service units 10 of mobile gateway 8. Lookup table 74 may represent a lookup primitive for an internal forwarding path of one of forwarding units 40 of FIG. 2. Lookup table 74 is a lookup table for GTP-U and used to internally route subscriber traffic among forwarding units 40 within mobile gateway 8. Lookup table 74 may represent all or a subset of aggregate routes 38A of FIG. 2. Aggregate routes 76A-76D ("aggregate routes 76") each include, as a lookup key, a range of TEIDs drawn from the GTP-U TEID namespace.

The GTP-U TEID namespace is apportioned into a plurality of contiguous, non-overlapping ranges of TEIDs. The ranges may be of equal size or may apportioned in different sizes, and the combination of ranges may represent the entire GTP-C TEID namespace.

Each of aggregate routes 76 includes, as a next hop result for a matching lookup operation, the identifier or address of one of forwarding units 40 that anchors subscriber sessions identified by protocol session identifiers that match the aggregate route key. As explained above, a centralized allocation manager 28 may direct, autonomously or responsively, the allocation of protocol session identifier ranges for data protocols to subscriber management service units 10. For a particular protocol session identifier range, one of subscriber management service units 10 selects an anchoring forwarding unit 40 and binds the range to the selected forwarding unit. Less than the full plurality of ranges may be bound at any one time during operation of mobile gateway 8. The centralized allocation manager generates aggregate routes 76 based at least on the binding and installs the routes to lookup table 74.

A forwarding unit 40 that receives subscriber traffic for mobile gateway 8 determines an encapsulating data protocol of the traffic. If the data protocol is GTP-U, i.e., the subscriber traffic includes a GTP-U header, the forwarding unit 40 determines and keys the GTP-U TEID for the control plane traffic to lookup table 74 for GTP-U. The forwarding unit 40 then directs the subscriber traffic to the next hop result of the one of aggregate routes 76 that includes a TEID range that includes the GTP-U TEID for the subscriber traffic. Forwarding units 40 may include a similar, corresponding lookup table that maps IP address chunks to respective anchoring forwarding units 40 for the chunks.

Figure 4:
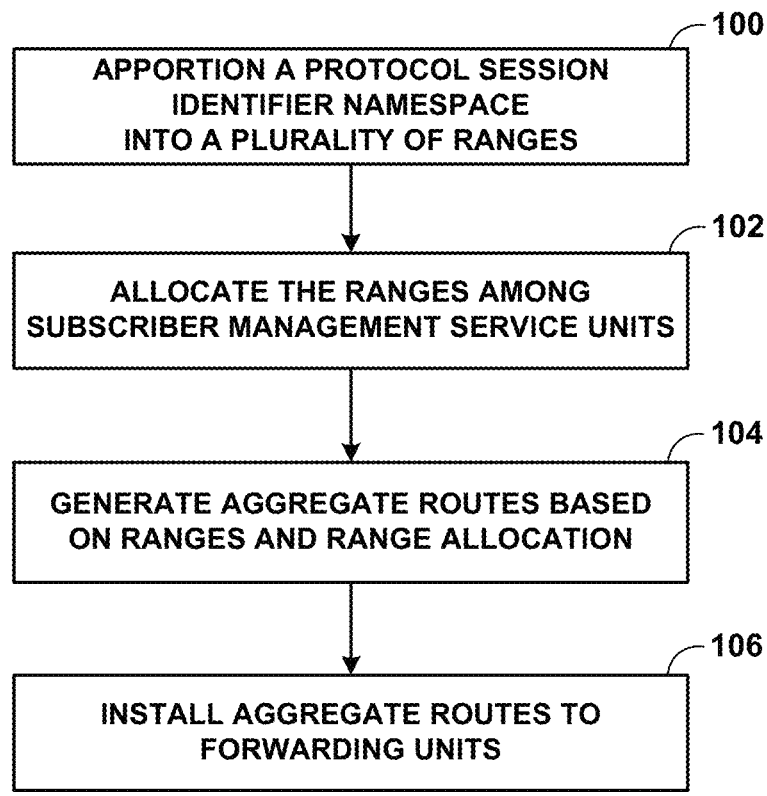
FIG. 4 is a flowchart illustrating an example mode of operation of the mobile gateway of FIG. 2 to apportion and allocate protocol session identifier ranges and to generate and install aggregate routes to the data plane in accordance with techniques described herein.

FIG. 4 is a flowchart illustrating an example mode of operation of mobile gateway 8 of FIG. 2 to apportion and allocate protocol session identifier ranges and to generate and install aggregate routes to the data plane in accordance with techniques described herein. Protocol range allocation manager 28 apportions a protocol session identifier namespace for a control protocol into a plurality of contiguous, non-overlapping ranges (100). Allocation manager 28 allocates the various ranges among subscriber management service units 10 (102).

Based at least on the apportioned ranges, allocation manager 28 generates lookup keys for a plurality of aggregate routes that resolve to subscriber management service units 10 (104). In other words, each of the generated aggregate routes includes a lookup key that matches an apportioned protocol session identifier range and resolves to the subscriber management service unit to which the range is allocated by allocation manager 28. Allocation manager 28 installs the aggregated routes to forwarding units 40 (106).

Figure 5:
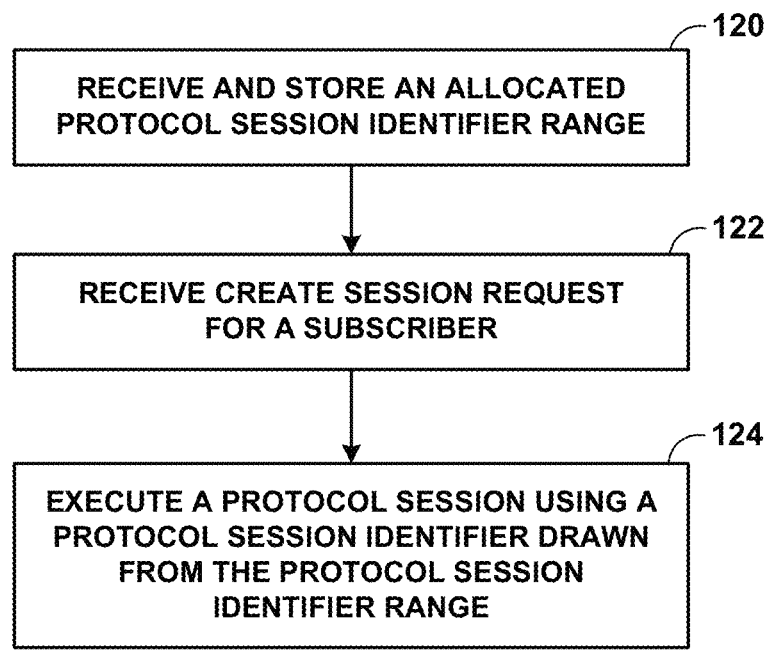
FIG. 5 is a flowchart illustrating an example mode of operation of a subscriber management service unit of the mobile gateway of FIG. 2 to establish a subscriber session by executing a control protocol using an allocated range of protocol session identifiers according to techniques of this disclosure.

FIG. 5 is a flowchart illustrating an example mode of operation of subscriber management service unit 10A of mobile gateway 8 to establish a subscriber session by executing a control protocol using an allocated range of protocol session identifiers according to techniques of this disclosure. Resource manager 34 receives a protocol session identifier range for a control protocol and stores the range to protocol ranges 41 (120). Session control module 54 receives a request to create a subscriber session with which to handle subscriber traffic (122). To create the subscriber session, session control module 54 executes a control protocol session and uses a protocol session identifier drawn from the range stored to protocol ranges 41 for the control protocol (124). As a result, control protocol messages for the protocol session may be associated with service unit 10A for internal routing to the service unit.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general- or special-purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the invention have been described. These and other embodiments are within the scope of the following claims.

What is claimed is:

1. A method comprising:
   storing, by a mobile gateway of a mobile network, data that defines a plurality of protocol session identifier ranges for a data protocol;
   for a protocol session identifier range from the protocol session identifier ranges, binding the protocol session identifier range to a first forwarding unit from a plurality of forwarding units of the mobile gateway, wherein each forwarding unit from the plurality of forwarding units anchors at least one subscriber session, from a plurality of subscriber sessions, to process data traffic associated with the at least one subscriber session;
   receiving, by the mobile gateway, a session request that identifies a wireless device and requests the mobile gateway to serve as an anchor for a subscriber session for the wireless device for accessing a packet data network;
   selecting, by the mobile gateway, a protocol session identifier from the protocol session identifier range to identify data traffic associated with a subscriber session, from the plurality of subscriber sessions, established by the mobile gateway in response to the session request;
   based at least on the binding, anchoring the subscriber session with the forwarding unit;
   generating, by the mobile gateway, an aggregate route that maps the protocol session identifier range to the first forwarding unit; and
   applying, by a second forwarding unit from the plurality of forwarding units, the aggregate route to forward data traffic identified by the protocol session identifier to the first forwarding unit.

2. The method of claim 1, further comprising:
   installing, by the mobile gateway, the aggregate route to each forwarding unit from the plurality of forwarding units.

3. The method of claim 1,
   wherein the data protocol comprises a General Packet Radio Service (GPRS) tunneling protocol for user data (GTP-U), and
   wherein the plurality of protocol session identifier ranges comprise a plurality of contiguous, non-overlapping TEID ranges of a GTP-U tunnel identifier (TEID) namespace.

4. The method of claim 1, further comprising:
   allocating, by the mobile gateway, the protocol session identifier range to a subscriber management service unit from a plurality of subscriber management service units of the mobile gateway; and
   selecting the protocol session identifier by the subscriber management service unit from the protocol session identifier range.

5. The method of claim 4, wherein the subscriber management service units present a uniform interface to nodes within the mobile network.

6. The method of claim 4,
   wherein binding the protocol session identifier range to the first forwarding unit from the plurality of forwarding units comprises binding, by the subscriber management service unit, the protocol session identifier range to the first forwarding unit from the plurality of forwarding units,
   the method further comprising:
   advertising, by the subscriber management service unit, an indication of the binding to a routing unit of the mobile gateway.

7. The method of claim 1,
   wherein the data protocol comprises an Internet Protocol (IP), and
   wherein the plurality of protocol session identifier ranges comprise a plurality of contiguous, non-overlapping IP address ranges of an IP address namespace.

8. The method of claim 7, further comprising:
   allocating, by the mobile gateway, the protocol session identifier range to a subscriber management service unit from a plurality of subscriber management service units of the mobile gateway,
   wherein selecting, by the mobile gateway, the protocol session identifier comprises receiving, by the subscriber management service unit, an IP address allocated for the subscriber session from an external server, wherein the IP address is the protocol session identifier.

9. The method of claim 1,
   wherein the wireless device comprises a first wireless device,
   wherein the session request comprises a first session request,
   wherein the subscriber session comprises a first subscriber session, and
   wherein the protocol session identifier comprises a first protocol session identifier, the method further comprising:
   receiving, by the mobile gateway, a second session request that identifies a second wireless device and requests the mobile gateway to serve as an anchor for a second subscriber session for the second wireless device for accessing the packet data network;

selecting, by the mobile gateway, a second protocol session identifier from the protocol session identifier range to identify data traffic associated with the second subscriber session established by the mobile gateway in response to the second session request;

determining, by the mobile gateway, the first forwarding unit is at a subscriber session capacity;

by the mobile gateway and in response to determining the first forwarding unit is at a subscriber session capacity, anchoring the second subscriber session with the second forwarding unit from the plurality of forwarding units;

generating, by the mobile gateway, an internal route that maps the second protocol session identifier to the second forwarding unit; and installing, by the mobile gateway, the route to at least one of the plurality of forwarding units.

10. A mobile gateway of a mobile network that provides access to a service of a packet data network, the mobile gateway comprising:

a plurality of forwarding units, wherein each forwarding unit from the plurality of forwarding units anchors at least one subscriber session, from a plurality of subscriber sessions, to process data traffic associated with the at least one subscriber session;

a routing unit configured to store data that defines a plurality of protocol session identifier ranges for a data protocol;

a subscriber management service unit from a plurality of subscriber management service units, the subscriber management service unit configured to:

for a protocol session identifier range from the protocol session identifier ranges, bind the protocol session identifier range to a first forwarding unit from the plurality of forwarding units;

receive a session request that identifies a wireless device and requests the mobile gateway to serve as an anchor for a subscriber session for the wireless device for accessing the packet data network;

select a protocol session identifier from the protocol session identifier range to identify data traffic associated with a subscriber session, from the plurality of subscriber sessions, established by the subscriber management service unit in response to the session request; and based at least on the binding, anchor the subscriber session with the forwarding unit, wherein the routing unit is configured to generate an aggregate route that maps the protocol session identifier range to the first forwarding unit and install the aggregate route to a second forwarding unit from the plurality of forwarding units, and wherein the second forwarding unit is configured to apply the aggregate route to forward data traffic identified by the protocol session identifier to the first forwarding unit.

11. The mobile gateway of claim 10, wherein the routing unit installs the aggregate route to each forwarding unit from the plurality of forwarding units.

12. The mobile gateway of claim 10, wherein the data protocol comprises a General Packet Radio Service (GPRS) tunneling protocol for user data (GTP-U), and wherein the plurality of protocol session identifier ranges comprise a plurality of contiguous, non-overlapping TED ranges of a GTP-U tunnel identifier (TEID) namespace.

13. The mobile gateway of claim 10, wherein the routing unit is configured to allocate the protocol session identifier range to the subscriber management service unit.

14. The mobile gateway of claim 10, wherein the subscriber management service units present a uniform interface to nodes within the mobile network.

15. The mobile gateway of claim 10, wherein the subscriber management service unit is configured to advertise an indication of the binding to the routing unit.

16. The mobile gateway of claim 10, wherein the data protocol comprises an Internet Protocol (IP), and wherein the plurality of protocol session identifier ranges comprise a plurality of contiguous, non-overlapping IP address ranges of an IP address namespace.

17. The mobile gateway of claim 16, wherein the routing unit is configured to allocate the protocol session identifier range to the subscriber management service unit, wherein to select the protocol session identifier the subscriber management service unit is further configured by receive an IP address allocated for the subscriber session from an external server, wherein the IP address is the protocol session identifier.

18. The mobile gateway of claim 10, wherein the wireless device comprises a first wireless device, wherein the session request comprises a first session request, wherein the subscriber session comprises a first subscriber session, and wherein the protocol session identifier comprises a first protocol session identifier, the subscriber management service unit configured to:

receive a second session request that identifies a second wireless device and requests the mobile gateway to serve as an anchor for a second subscriber session for the second wireless device when accessing one of the packet data networks;

select a second protocol session identifier from the protocol session identifier range to identify data traffic associated with the second subscriber session established by the subscriber management service unit in response to the second session request;

determine, by the subscriber management service unit, the first forwarding unit is at a subscriber session capacity; and by the subscriber management service unit and in response to determining the first forwarding unit is at a subscriber session capacity, anchor the second subscriber session with the second forwarding unit from the plurality of forwarding units, wherein the routing unit is configured to generate an internal route that maps the second protocol session identifier to the second forwarding unit and install the route to at least one of the plurality of forwarding units.

19. A non-transitory computer-readable medium comprising instructions for causing one or more programmable processors to:

store, by a mobile gateway of a mobile network, data that defines a plurality of protocol session identifier ranges for a data protocol; and for a protocol session identifier range from the protocol session identifier ranges, bind the protocol session identifier range to a first forwarding unit from a plurality of forwarding units of the mobile gateway, wherein each forwarding unit from the plurality of forwarding units anchors at least one subscriber session, from a plurality of subscriber sessions, to process data traffic associated with the at least one subscriber session;

receive, by the mobile gateway, a session request that identifies a wireless device and requests the mobile gateway to serve as an anchor for a subscriber session for the wireless device for accessing a packet data network;

select, by the mobile gateway, a protocol session identifier from the protocol session identifier range to identify data traffic associated with a subscriber session, from the plurality of subscriber sessions, established by the mobile gateway in response to the session request; and based at least on the binding, anchor the subscriber session with the forwarding unit;

generating, by the mobile gateway, an aggregate route that maps the protocol session identifier range to the first forwarding unit; and applying, by a second forwarding unit from the plurality of forwarding units, the aggregate route to forward data traffic identified by the protocol session identifier to the first forwarding unit.

* * * * *

UNITED STATES PATENT AND TRADEMARK OFFICE
CERTIFICATE OF CORRECTION

PATENT NO. : 9,674,870 B1  
APPLICATION NO. : 14/159244  
DATED : June 6, 2017  
INVENTOR(S) : Srinivasa Chaganti et al.

Page 1 of 1

It is certified that error appears in the above-identified patent and that said Letters Patent is hereby corrected as shown below:

Column 26, Line 3 (Claim 12): Replace "TED ranges of" with --TEID ranges of--

Signed and Sealed this
Twenty-eighth Day of August, 2018

Andrei Iancu
*Director of the United States Patent and Trademark Office*